`US009908984B2`

(12) United States Patent
Neff et al.

(10) Patent No.: US 9,908,984 B2
(45) Date of Patent: Mar. 6, 2018

(54) FLAME RETARDANT POLYURETHANE FOAM AND METHOD FOR PRODUCING SAME

(71) Applicant: BASF SE, Lugwigshafen (DE)

(72) Inventors: Raymond Neff, Bloomfield Hills, MI (US); Liying Wang, Bloomfield Hills, MI (US); Alexander Gershanovich, Beverly Hills, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/773,926

(22) PCT Filed: Mar. 5, 2014

(86) PCT No.: PCT/US2014/020506
§ 371 (c)(1),
(2) Date: Sep. 9, 2015

(87) PCT Pub. No.: WO2014/149711
PCT Pub. Date: Sep. 25, 2014

(65) Prior Publication Data
US 2016/0046779 A1 Feb. 18, 2016

Related U.S. Application Data

(60) Provisional application No. 61/787,018, filed on Mar. 15, 2013.

(51) Int. Cl.
| | |
|---|---|
| C08J 9/00 | (2006.01) |
| C08G 18/76 | (2006.01) |
| C08G 18/79 | (2006.01) |
| C08G 18/48 | (2006.01) |
| C08K 3/04 | (2006.01) |
| C08K 5/521 | (2006.01) |
| C08G 18/08 | (2006.01) |
| C08G 101/00 | (2006.01) |

(52) U.S. Cl.
CPC ............ *C08J 9/0066* (2013.01); *C08G 18/14* (2013.01); *C08G 18/48* (2013.01); *C08G 18/7664* (2013.01); *C08G 18/7671* (2013.01); *C08G 18/797* (2013.01); *C08J 9/0023* (2013.01); *C08J 9/0038* (2013.01); *C08J 9/0095* (2013.01); *C08K 3/04* (2013.01); *C08K 5/521* (2013.01); C08G 2101/005 (2013.01); C08G 2101/0008 (2013.01); C08G 2101/0025 (2013.01); C08G 2101/0058 (2013.01); C08G 2101/0066 (2013.01); C08J 2201/02 (2013.01); C08J 2205/06 (2013.01); C08J 2205/10 (2013.01); C08J 2375/08 (2013.01); C08J 2375/12 (2013.01)

(58) Field of Classification Search
CPC ...... C08J 9/0066; C08J 9/0095; C08J 9/0023; C08J 9/0038; C08J 2205/10; C08J 2205/06; C08J 2375/12; C08J 2201/08; C08J 2375/08; C08G 18/14; C08G 18/7671; C08G 18/7664; C08G 18/797; C08G 18/48; C08G 2101/005; C08G 2101/0025; C08G 2101/0066; C08G 2101/0008; C08G 2101/0058; C08K 3/04; C08K 5/521; C08L 75/08
See application file for complete search history.

(56) References Cited

U.S. PATENT DOCUMENTS

| | | | |
|---|---|---|---|
| 4,839,393 A | 6/1989 | Buchanan et al. | |
| 5,169,876 A | 12/1992 | Heitmann et al. | |
| 5,494,941 A * | 2/1996 | Lutter | C08G 18/12 521/159 |
| 5,739,173 A * | 4/1998 | Lutter | C08G 18/3851 521/100 |
| 2002/0020827 A1 | 2/2002 | Munzenberger et al. | |
| 2003/0130365 A1* | 7/2003 | Eling | C08J 9/0038 521/99 |
| 2012/0022176 A1* | 1/2012 | Stahl | C08G 18/715 521/103 |
| 2013/0197113 A1* | 8/2013 | Stahl | C08K 3/04 521/103 |

FOREIGN PATENT DOCUMENTS

| | | |
|---|---|---|
| CN | 101503567 A | 8/2009 |
| WO | WO 2012/067841 A2 | 5/2012 |
| WO | WO 2013/003027 A2 | 1/2013 |

OTHER PUBLICATIONS

International Search Report for Application No. PCT/US2014/020506 dated Jun. 6, 2014, 3 pages.
English language abstract and machine-assisted English translation for CN 101503567 extracted from espacenet.com database on Jun. 5, 2017, 18 pages.

* cited by examiner

*Primary Examiner* — John Cooney
(74) *Attorney, Agent, or Firm* — DLA Piper LLP (US)

(57) ABSTRACT

A polyurethane foam having an initial UL 94 vertical flame classification of V-0 and maintaining a UL 94 vertical flame classification of V-0 after one week of heat aging at 150° C. is formed as the reaction product of an isocyanate component and an isocyanate-reactive component in the presence of a blowing agent. The isocyanate component includes an isocyanate-containing compound and a non-reactive phosphorous compound that is present in an amount ranging from 1 to 20 weight percent based on the total weight of the polyurethane foam. The isocyanate-reactive component includes a polyether polyol and expandable graphite that is present in an amount ranging from 3 to 30 weight percent based on the total weight of the polyurethane foam.

11 Claims, No Drawings

FLAME RETARDANT POLYURETHANE FOAM AND METHOD FOR PRODUCING SAME

RELATED APPLICATIONS

This application is the National Stage of International Patent Application No. PCT/US2014/020506, filed on Mar. 5, 2014, which claims priority to and all the advantages of U.S. Patent Application No. 61/787,018, filed on Mar. 15, 2013, the content of which is incorporated herein by reference.

BACKGROUND OF THE INVENTION

1. Field of the Invention

The instant disclosure generally relates to polyurethane foam and a method for producing the polyurethane foam. More specifically, the subject invention relates to polyurethane foam that exhibits flame retardancy.

2. Description of the Related Art

Polyurethane foams exhibit a wide range of stiffness, hardness, and density. One type of polyurethane foam, flexible polyurethane foam, is especially useful for providing cushioning, support, and comfort for furniture articles. For example, flexible polyurethane foam is often incorporated into furniture comfort articles, such as cushions, padding, mattresses, topper pads, and pillows, as well as into furniture support articles, such as sofas, love seats, and chairs.

Other types of polyurethane foams are especially useful for noise, vibration, and harshness (NVH) reduction components for vehicles such as automobiles. For example, certain flexible or rigid foams may be incorporated into various interior automotive components, such as door frames, and various engine compartment components having cavities that are filled with the polyurethane foam.

Polyurethane foams are typically flammable, but can be formulated to retard small open flame ignition sources. Various approaches for producing polyurethane foams which exhibit flame retardancy are known in the art. For example, flame retardant additives including minerals, such as aluminum trihydrate; salts, such as hydroxymethyl phosponium salts; phosphorous compounds; phosphated esters; and halocarbons or other halogenated compounds, such as those containing bromine and/or chlorine; may be included in an isocyanate-reactive component used to form the polyurethane foam.

SUMMARY OF THE INVENTION AND ADVANTAGES

The subject invention provides a polyurethane foam having an initial UL 94 vertical flame classification of V-0 and maintaining a UL 94 vertical flame classification of V-0 after one week of heat aging at 150° C. The polyurethane foam comprises the reaction product of an isocyanate component and an isocyanate-reactive component in the presence of a blowing agent. The isocyanate component includes an isocyanate-containing compound and a non-reactive phosphorous compound. The non-reactive phosphorous compound has a cumulative weight loss of 2% or less above 200° C. as measured by thermogravimetric analysis (10° C./min. heating rate in nitrogen). The isocyanate-reactive component includes a polyether polyol and expandable graphite present in an amount ranging from 3 to 30 weight percent based on the total weight of the polyurethane foam.

The subject invention also provides a method of producing the polyurethane foam. The method comprises the steps of providing the isocyanate component and the isocyanate-reactive component as set forth above and reacting the isocyanate component with the isocyanate-reactive component in the presence of the blowing agent to produce the polyurethane foam.

The polyurethane foam of the subject invention has an initial UL 94 vertical flame classification of V-0 and maintains a UL 94 vertical flame classification of V-0 after one week of heat aging at 150° C. It is believed that the synergistic effect of the addition of the non-reactive phosphorous compound and the expandable graphite to the polyurethane foam contributes to its improved flammability resistance. Moreover, the premixing of the non-reactive phosphorous compound with the isocyanate-containing compound, as opposed the premixing of the non-reactive phosphorous compound with the isocyanate-reactive component, minimizes stability issues associated with the presence of moisture in the isocyanate-reactive component that could have a deleterious effect on the formation of the polyurethane foam and also provides increased manufacturing efficiency and decreased costs by minimizing the storage of separate components and limiting the number of mixing heads on equipment. In addition, the premixing of the non-reactive phosphorous compound with the isocyanate-reactive component allows easier adjustment of the ratio of the isocyanate to hydroxyl group ratios based upon the capability of the mixing equipment and machine output utilized.

In addition, the polyurethane foam formed in accordance with the present invention exhibits excellent noise, vibration and harshness (NVH) properties and other support properties, e.g., flexibility and stability, even after severe heat aging, such as after one week of heat aging at 150° C. The polyurethane foam in accordance with the present invention is particularly suitable for engine compartment articles for vehicles, but may find application in other applications beyond engine compartments where polyurethane foams may be utilized and in particular wherein NVH reduction and flame retardancy is desirable.

DETAILED DESCRIPTION OF THE INVENTION

The present invention is directed to polyurethane foams that exhibit flame retardancy and associated methods of producing these polyurethane foams. The polyurethane foams may be a flexible polyurethane foam or a rigid polyurethane foam or a semi-rigid polyurethane foam which exhibits at least some characteristics of both rigid and flexible polyurethane foams, as described below.

As used herein, the terminology "flexible polyurethane foam" denotes a class of flexible polyurethane foam and stands in contrast to rigid polyurethane foam. Flexible polyurethane foam is generally porous, having open cells and pneumatic properties, whereas rigid polyurethane foam is generally non-porous, having closed cells and no rubber-like characteristics. In particular, flexible polyurethane foam is a flexible cellular product which will not rupture when a specimen 200 mm by 25 mm by 25 mm is bent around a 25-mm diameter mandrel at a uniform rate of 1 lap in 5 seconds at a temperature between 18 and 29° C., as defined by ASTM D3574-03. Further, polyol selection impacts the stiffness of flexible polyurethane foams. That is, flexible polyurethane foams are typically produced from polyols having weight average molecular weights from about 1,000 to about 10,000 g/mol and hydroxyl numbers from about 10 to about 200 mg KOH/g. In contrast, "rigid polyurethane foams" are typically produced from polyols having weight average molecular weights from about 250 to about 700 g/mol and hydroxyl numbers from about 300 to about 700 mg KOH/g. Moreover, flexible polyurethane foams generally include more urethane linkages as compared to rigid polyurethane foams, whereas rigid polyurethane foams may include more isocyanurate linkages as compared to flexible polyurethane foams. Further, flexible polyurethane foams are typically produced from polyols having low-functionality (f) initiators, i.e., f<4, such as dipropylene glycol (f=2) or glycerine (f=3). By comparison, rigid polyurethane foams are typically produced from polyols having high-functionality initiators, i.e., f≥4, such as Mannich bases (f=4), toluenediamine (f=4), sorbitol (f=6), or sucrose (f=8). Additionally, as known in the art, flexible polyurethane foams are typically produced from glycerine-based polyether polyols, whereas rigid polyurethane foams are typically produced from polyfunctional polyols that create a three-dimensional cross-linked cellular structure, thereby increasing the stiffness of the rigid polyurethane foam. Finally, although both flexible polyurethane foams and rigid polyurethane foams include cellular structures, flexible polyurethane foams typically include more open cell walls, which allow air to pass through the flexible polyurethane foam when force is applied as compared to rigid polyurethane foams. As such, flexible polyurethane foams typically recover shape after compression. In contrast, rigid polyurethane foams typically include more closed cell walls, which restrict air flow through the rigid polyurethane foam when force is applied. Therefore, flexible polyurethane foams are typically useful for cushioning and support applications, e.g., furniture comfort and support articles, whereas rigid polyurethane foams are typically useful for applications requiring thermal insulation, e.g., appliances and building panels and automotive components such as door frames. Moreover, certain flexible, semi-rigid or rigid polyurethane foams may be useful for engine compartment components.

The polyurethane foam of the present invention comprises the reaction product of an isocyanate component and an isocyanate-reactive component. It is to be appreciated that the terminology "isocyanate component" as used herein, is not limited to monomeric isocyanate, i.e., the isocyanate component may comprise monomeric isocyanates and polymeric isocyanates. In addition, the terminology "isocyanate component" as used herein, encompasses prepolymers. Said differently, prepolymers, e.g., polyols reacted with excess isocyanate, may be utilized as the isocyanate component in the present invention.

The isocyanate component comprises an isocyanate-containing compound. Typically, the isocyanate-containing compound (i.e., an NCO group containing compound) comprises polymeric diphenylmethane diisocyanate (pMDI). PMDI is typically present in the isocyanate component to provide reactive groups, i.e., NCO groups, during a flexible polyurethane foaming reaction, as set forth in more detail below. PMDI is typically a mixture of oligomeric diphenylmethane diisocyanates, i.e., a mixture of MDI and its dimer and/or trimer. PMDI comprises a crude MDI having three or more benzene rings including NCO groups. PMDI is typically obtained through the condensation of aniline and formaldehyde in the presence of an acid catalyst, followed by phosgenation and distillation of a resulting polymeric amine mixture. PMDI is typically present in the isocyanate component in an amount of from about 1 to about 30, more typically from about 5 to about 25, even more typically from about 8 to about 12 parts by weight based on 100 parts by weight of the isocyanate component.

The isocyanate-containing compound typically further comprises a monomeric diphenylmethane diisocyanate (MDI) component. As understood in the art, the terminology "monomeric MDI" denotes a component encompassing the MDI isomers, such as 2,4'-MDI, 4,4'-MDI, and/or 2,2'-MDI. The monomeric MDI component of the present invention comprises 2,4'-MDI and 4,4'-MDI. As compared to 4,4'-MDI, 2,4'-MDI is an asymmetrical molecule and provides two NCO groups of differing reactivities. Without intending to be limited by theory, it is believed that 2,4'-MDI influences the flexible polyurethane foaming reaction parameters such as stability and curing time of the flexible polyurethane foam.

The monomeric MDI component is typically present in the isocyanate component in an amount of from about 70 to about 99, more typically from about 75 to about 95, even more typically from about 88 to about 92 parts by weight based on 100 parts by weight of the isocyanate component. As set forth above, the monomeric MDI component comprises 2,4'-MDI and 4,4'-MDI. In terms of the overall isocyanate component, the 2,4'-MDI is typically present in the isocyanate component in an amount of from about 10 to about 50, more typically from about 30 to about 48, even more typically from about 39 to about 45 parts by weight based on 100 parts by weight of the isocyanate component. Generally, the remainder of the isocyanate component (i.e., the isocyanate component other than pMDI and 2,4'-MDI) comprises 4,4'-MDI, but in certain embodiments other isocyanates in addition to or partially substituting for the polymeric and monomeric isocyanates may be utilized, including commonly known aromatic, aliphatic, cycloaliphatic and/or araliphatic isocyanates such as, for example, 1,5-naphthylene diisocyanate (NDI), 2,4- and/or 2,6-tolylene diisocyanate (TDI), 3,3'-dimethylbiphenyl diisocyanate, 1,2-diphenylethane diisocyanate and/or phenylene diisocyanate, tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), 1,4-cyclohexane diisocyanate, 1-methyl-2,4- and/or -2,6-cyclohexane diisocyanate and/or 4,4'-, 2,4'- and 2,2'-dicyclohexylmethane diisocyanate ($H_{12}$MDI).

In certain embodiments, the monomeric MDI component diphenylmethane diisocyanate (MMDI)) is modified and stabilized utilizing carbodiimide chemistry, wherein a portion of the MMDI is reacted to yield a carbodiimide-modified isocyanate with a free-NCO weight between 29.2% and 29.5%. The carbodiimide-modification leads to the formation of a 3-functional uretonimine species within the remaining difunctional MMDI. A suitable carbodiimide-modified isocyanate component for purposes of the present invention is MMDI that may be utilized is NA36100450-2-4, commercially available from BASF Corporation of Florham Park, N.J.

Without intending to be limited by theory, it is believed that isocyanate-containing compound, which comprises pMDI and the monomeric MDI component, including the carbodiimide modified monomeric MDI component, contributes to the excellent flame retardancy of the polyurethane foam produced therefrom because the monomeric MDI component (unmodified and carbodiimide modified) and the pMDI change the melt characteristics of the polyurethane foam. For example, it is believed that the monomeric MDI component (unmodified and carbodiimide modified) and the pMDI provide additional char formation during burning for the polyurethane foam. Additional char formation typically forms a stable, carbonaceous barrier which prevents a flame from accessing the underlying polyurethane foam. More specifically, it is believed that the isocyanate-containing compound affects the crystallinity of the polyurethane foam so that, when exposed to a flame, the flexible polyurethane foam melts away from flame rather than remaining in the flame. Stated differently, the isocyanate-containing compound provides the polyurethane foams of the present invention with a continuous crystalline matrix that provides a charred barrier to flame propagation. Additionally, it is believed that the isocyanate-containing compound minimizes vapor formation when the polyurethane foam of the present invention is exposed to heat. Since flame propagation requires a vapor phase, the polyurethane foam of the present invention exhibits excellent flame retardancy under flammability tests according UL-94 flammability standards.

The isocyanate-containing compound typically has NCO groups present in the isocyanate component in an amount of about 33 parts by weight based on 100 parts by weight of the isocyanate component. Further, the isocyanate-containing compound typically has a viscosity of about 17 cps at 25° C. and an average functionality of about 2.1. The isocyanate-containing compound typically has a flash point of about 200° C. and a density of about 1.20 g/cm$^3$ at 25° C., which allows for processing efficiencies such as ease of component mixing, thereby contributing to the cost effectiveness of producing the polyurethane foam.

In certain embodiments, the isocyanate-containing compound consists essentially of the pMDI and the monomeric MDI component (unmodified and/or carbodiimide modified). In these embodiments, the pMDI is typically present in the isocyanate component in an amount of from about 5 to about 25 parts by weight based on 100 parts by weight of the isocyanate component and the monomeric MDI component is typically present in the isocyanate component in an amount of from about 75 to about 95 parts by weight based on 100 parts by weight of the isocyanate component. In these embodiments, the isocyanate-containing compound is typically free from isocyanates other than pMDI and the monomeric MDI component, which comprises 2,4'-MDI and 4,4'-MDI, as described above.

In certain embodiments, the isocyanate component further comprises a non-reactive phosphorous compound present in an amount ranging from 1 to 20 weight percent based on the total weight of the formed polyurethane foam, such as from 3 to 15 weight percent, such as from 5 to 10 weight percent. The non-reactive phosphorous compound, while classified as an isocyanate component for description herein, is not an isocyanate-containing compound that participates in the reaction between the isocyanate-containing compound and the polyether polyol, but is a component that remains in the formed polyurethane foam, as described further below. Stated another way, the term "non-reactive" as in "non-reactive phosphorous compound" as utilized in the present invention is indicative of a phosphorous compound that does not include functional groups that react with the isocyanate groups of the isocyanate containing compound.

Preferably, the non-reactive phosphorous compound is premixed with the isocyanate-containing compound prior to the isocyanate-containing compound being introduced and reacted with the polyether polyol due to the substantial absence of water in the stored isocyanate-containing compound. This premixing is desirable due to the fact that water reacts with organic phosphates to form phosphoric acid and alcohol. The phosphoric acid in turn blocks the tertiary amine catalysts (described below) in the foam formulation, which slows the blowing and gelling reactions necessary to produce polyurethane foam. This results in either poor quality foam or foam collapse. Thus, it is desirable to store the non-reactive phosphorous compound in the absence of water as well. As the isocyanate reactive component contains up to 4% water, it is undesirable to premix the non-reactive phosphorous compound with the isocyanate reactive component.

Another advantage of premixing the non-reactive phosphorous compound with the isocyanate-containing compound, in a manufacturing setting, is that it reduces storage costs as compared with storing each of these components separately. In addition, because the non-reactive phosphorous compound is not reactive with the isocyanate-containing compound, it may be introduced to a mixing chamber or vessel through the same pressure nozzle as the isocyanate-containing component without affecting the physical properties of the formed polyurethane foam. In addition, the premixing of the non-reactive phosphorous compound with the isocyanate-reactive component allows for easier adjustment of the isocyanate to hydroxyl group ratios based upon the capability of the mixing equipment and machine output utilized.

However, while it is desirable to premix the non-reactive phosphorous compound with the isocyanate-containing compound as described above, in certain other embodiments, the non-reactive phosphorous compound may stored separately and introduced to the isocyanate-reactive component at the same time the isocyanate-containing compound is introduced, or in certain embodiments may be mixed with the isocyanate-reactive component prior to the introduction of the isocyanate-containing compound.

In these embodiments, the non-reactive phosphorous compound has a cumulative weight loss of 2% or less at 200° C. as measured by thermogravimetric analysis (10° C./min. heating rate in nitrogen). Stated another way, the non-reactive phosphorous compound has high thermal stability, in that it substantially remains in the formed foam following heat exposure, and therefore maintains flammability resistance due to its presence. The term cumulative refers to the total weight of the non-reactive phosphorous compound, including any residual additives, solvents, or the like that may be present in the non-reactive phosphorous compound.

In certain embodiments, the non-reactive phosphorous compound is liquid at ambient temperatures of about 25° C., and in still other embodiments the non-reactive phosphorous compound does not contain halogens.

Exemplary non-reactive phosphorous compounds having the cumulative weight loss of 2% or less at 200° C. as measured by thermogravimetric analysis as noted above that may be used include Fyrolflex BDP (bisphenol A diphosphate, available from ICL Industrial Products), Fyrolflex RDP (resorcinol bis A (diphenyl phosphate), available from ICL Industrial Products), isodecyl diphenyl phosphate (such as Phosflex® 390, available form ILC Industrial Products), tricresyl phosphate (such as Lindol™, available from ICL Industrial Products) and combinations thereof.

The isocyanate-reactive component of the present invention comprises a polyether polyol. Typically, the polyether polyol has a weight average molecular weight (Mw) of from about 1000 to about 20,000 g/mol. The polyether polyol more typically has a weight average molecular weight of from about 2,500 to about 6,000 g/mol. In certain embodiments, the polyether polyol is a polyether triol. As known in the art, polyether polyols are generally produced by reacting an alkylene oxide with an initiator in the presence of a catalyst, such as a basic catalyst or a double metal cyanide (DMC) catalyst. Even more typically, ethylene oxide (EO) is utilized such that the resulting polyether polyols are EO-capped. In certain embodiments, the terminal caps of the polyether polyol comprise propylene oxide (PO) groups or ethylene oxide (EO) groups, preferably EO groups. However, it is to be appreciated that the terminal caps of the polyether polyol may comprise other alkylene oxide groups, such as butylene oxide (BO) groups, or combinations of such alkylene oxide groups. Stated differently, the plurality of terminal caps of the polyether polyol typically comprise an alkylene oxide group selected from PO groups, EO groups, BO groups, and combinations thereof. The polyether polyol typically has a hydroxyl number of from about 20 to about 100, more typically from about 25 to about 60 mg KOH/g.

The polyether polyol is typically present in the isocyanate-reactive component in an amount of from about 20 to about 100, more typically from about 40 to about 90, even more typically from about 50 to about 80 parts by weight based on 100 parts by weight of total polyol present in the isocyanate-reactive component.

In certain embodiments, the polyether polyol comprises a graft polyol, which denotes dispersed polymer solids chemically grafted to a carrier polyol. The graft polyol of the isocyanate-reactive component comprises the carrier polyol and particles of co-polymerized styrene and acrylonitrile, wherein the particles of co-polymerized styrene and acrylonitrile are dispersed in the carrier polyol, as set forth in more detail below. The carrier polyol of the graft polyol is a polyether polyol that may be the same or different from the polyether polyol described in the previous paragraphs. The graft polyol typically has a functionality of from about 2 to about 4, more typically from about 2.2 to about 3.

As noted previously, in certain embodiments, the carrier polyol of the graft polyol is a polyether polyol that is different from the polyether polyol described above. The carrier polyol may be any known polyether polyol in the art and preferably serves as a continuous phase for the dispersed co-polymerized styrene and acrylonitrile particles. That is, the co-polymerized styrene and acrylonitrile particles are dispersed in the carrier polyol to form a dispersion, i.e., to form the graft polyol. In certain embodiments, the carrier polyol is a polyether triol having a weight average molecular weight of from about 700 to about 20,000 g/mol, more typically from about 1,000 to about 10,000 g/mol, and more typically from about 2,000 to about 6,000 g/mol. The carrier polyol typically has the molecular weight so as to provide the polyurethane foam with flexibility and a desired density, as described in greater detail below. The molecular weight of the carrier polyol typically provides randomly-sized, irregular-shaped cells, e.g., cells that differ in both size and shape from neighboring cells.

The particles of co-polymerized styrene and acrylonitrile are dispersed in the carrier polyol in an amount of from about 20 to about 60, typically from about 25 to about 50, more typically from about 30 to about 40, and even more typically about 44 parts by weight of particles based on 100 parts by weight of the carrier polyol.

Without intending to be limited by theory, the graft polyol is typically present in the isocyanate-reactive component to provide the polyurethane foam with an optimal cross-sectional density and to adjust the solids level of the polyurethane foam. The graft polyol also typically contributes to the processability and hardness of the polyurethane foam. The graft polyol also allows for optimal cell opening during production of the polyurethane foam without having any adverse effects on the resilience of the polyurethane foam. Further, it is believed that the graft polyol may also contribute to the flame retardancy of the polyurethane foam of the present invention. However, it is to be appreciated that the graft polyol is not required in the present invention for the polyurethane foam to exhibit a vertical flame classification of V-0, in accordance with the UL-94 Tests for Flammability of Plastic Materials. When present, the graft polyol is typically present in the isocyanate-reactive component in an amount of from greater than 0 to about 100, more typically from about 5 to about 50, even more typically from about 10 to about 30 parts by weight based on 100 parts by weight of total polyol present in the isocyanate-reactive component. When the graft polyol is present in the isocyanate-reactive component in an amount of about 100 parts by weight, the isocyanate-reactive component still comprises polyether polyol as the carrier polyol in the graft polyol. The carrier polyol of the graft polyol may comprise the polyether triol illustrated and described above. Additionally, the graft polyol typically has hydroxyl number of from about 10 to about 60, more typically from about 20 to about 40 mg KOH/g. Further, the graft polyol typically has a viscosity of from about 1,000 to about 7,000 centipoise at 25° C., which allows for processing efficiencies such as ease of component mixing, thereby contributing to the cost effectiveness of producing the polyurethane foam.

The isocyanate-reactive component further comprises expandable graphite present in an amount ranging from 3 to 30 weight percent or from 5 to 20 weight percent or from 5 to 15 weight percent based on the total weight of the formed polyurethane foam. The expandable graphite, while classified as an isocyanate-reactive component for description herein, is not an isocyanate-reactive component that participates in the reaction between the isocyanate-containing compound and the polyether polyol, but is a component that remains in the formed polyurethane foam, as described further below. Preferably, the expandable graphite is stored or otherwise premixed with the polyether polyol prior to the being introduced and reacted with the isocyanate component, or with the isocyanate-containing compound of the isocyanate component. However, the expandable graphite may be stored separately and introduced to the isocyanate-containing compound at the same time the isocyanate-reactive component is introduced, or in certain embodiments may be mixed with the isocyanate component prior to the introduction of the isocyanate-reactive component.

The term "expandable graphite", also know as expandable flake graphite or intumescent flake graphite, or simply "expandable flake", is a form of intercalated graphite. Intercalation is a process whereby an intercallant material is inserted between the graphene layers of a graphite crystal or particle. After intercalation the resulting graphite material takes on new properties that are a function of the intercallant and the way it associates with the host (graphite) species. Both physical and chemical properties, including crystallographic structure, surface area, density, electronic properties, intumescent behavior, chemical reactivity, etc., may be affected by the intercallant.

A wide variety of chemical species have been used to intercalate graphite materials. These include halogens, alkali metals, sulfate, nitrate, various organic acids, aluminum chloride, ferric chloride, other metal halides, arsenic sulfide, thallium sulfide, etc.

The primary type of graphite intercalation compound is the "sulfate" intercalation compound sometimes referred to as "graphite bisulfate". This material is manufactured by treating highly crystalline natural flake graphite with a mixture of sulfuric acid and certain other oxidizing agents which aid in "catalysis" of the sulfate intercalation.

Suitable expandable graphite that may be utilized in the present invention includes Nyagraph 251, available from Nyacol Nano Technologies, which is described as a graphite ore treated with sulfuric acid in an intercalatation process.

The isocyanate-reactive component typically further comprises a cross-linking agent having a nominal functionality of less than 4. When utilized in the isocyanate-reactive component, the cross-linking agent generally allows phase separation between copolymer segments of the polyurethane foam. That is, the polyurethane foam typically comprises both rigid urea copolymer segments and soft polyol copolymer segments. The cross-linking agent typically chemically and physically links the rigid urea copolymer segments to the soft polyol copolymer segments. Therefore, the cross-linking agent is typically present in the isocyanate-reactive component to modify the hardness, increase stability, and reduce shrinkage of the polyurethane foam. When utilized, the cross-linking agent is typically present in the isocyanate-reactive component in an amount of from greater than zero to about 2, more typically from about 0.1 to about 1 parts by weight based on 100 parts by weight of total polyol present in the isocyanate-reactive component.

Suitable cross-linking agents include any cross-linking agent known in the art, such as diethanolamine. When utilized, diethanolamine is typically present in the cross-linking agent in an amount of about 85 parts by weight based on 100 parts by weight of the cross-linking agent. A specific example of a cross-linking agent suitable for the purposes of the present invention is Dabco™ DEOA-LF commercially available from Air Products and Chemicals, Inc. of Allentown, Pa.

The isocyanate-reactive component typically further comprises a catalyst component. The catalyst component is typically present in the isocyanate-reactive component to catalyze the polyurethane foaming reaction between the isocyanate component and the isocyanate-reactive component. It is to be appreciated that the catalyst component is typically not consumed to form the reaction product of the isocyanate component and the isocyanate-reactive component. That is, the catalyst component typically participates in, but is not consumed by, the polyurethane foaming reaction. When utilized, the catalyst component is typically present in the isocyanate-reactive component in an amount of from greater than 0 to about 2, more typically from about 0.10 to about 1 parts by weight based on 100 parts by weight of total polyol present in the isocyanate-reactive component. The catalyst component may include any suitable catalyst or mixtures of catalysts known in the art. Examples of suitable catalysts include, but are not limited to, gelation catalysts, e.g., crystalline catalysts in dipropylene glycol; blowing catalysts, e.g., bis(dimethylaminoethyl)ether in dipropylene glycol; and tin catalysts, e.g., tin octoate. A suitable catalyst component for purposes of the present invention is Dabco™ 33LV, commercially available from Air Products and Chemicals of Allentown, Pa. Dabco™ 33LV is a solution of 33% triethylenediamine and 67% dipropylene glycol and is typically utilized as a gelation catalyst.

In certain embodiments, the isocyanate-reactive component further comprises a cell opening additive. One exemplary cell opening additive that may be used in the present invention is Pluracol® 593, a polyether polyol commercially available from BASF Corporation of Florham Park, N.J.

The isocyanate-reactive component may further comprise an additive component. The additive component is typically selected from the group of surfactants, blocking agents, dyes, pigments, diluents, solvents, specialized functional additives such as antioxidants, ultraviolet stabilizers, biocides, adhesion promoters, antistatic agents, mold release agents, fragrances, and combinations of the group. When utilized, the additive component is typically present in the isocyanate-reactive component in an amount of from greater than 0 to about 15, more typically from about 1 to about 10 parts by weight based on 100 parts of total polyol present in the isocyanate-reactive component.

A surfactant is typically present in the additive component of the isocyanate-reactive component to control cell structure of the polyurethane foam and to improve miscibility of components and polyurethane foam stability. Suitable surfactants include any surfactant known in the art, such as silicones and nonylphenol ethoxylates. Typically, the surfactant is a silicone. More specifically, the silicone is typically a polydimethylsiloxane-polyoxyalkylene block copolymer. The surfactant may be selected according to the reactivity of the polyether polyol and/or the graft polyol, if present in the isocyanate-reactive component. When utilized, the surfactant is typically present in the isocyanate-reactive component in an amount of from about 0.5 to about 2 parts by weight based on 100 parts by weight of total polyol present in the isocyanate-reactive component. One exemplary surfactant that may be used in the present invention is B-4113-LF4, a silicone surfactant for flexible molded foam available from Evonik.

The additive component of the isocyanate-reactive component may also include a blocking agent. The blocking agent is typically present in the additive component of the isocyanate-reactive component to delay cream time and increase cure time of the polyurethane foam. Suitable blocking agents include any blocking agent known in the art. Typically, the blocking agent is a polymeric acid, i.e., a polymer with repeating units and multiple acid-functional groups. One skilled in the art typically selects the blocking agent according to the reactivity of the isocyanate component.

In certain embodiments, the isocyanate component and the isocyanate-reactive component are reacted in the presence of a blowing agent to produce the polyurethane foam. More specifically, the isocyanate-containing compound reacts with the polyether polyol in the presence of the blowing agent to produce the polyurethane foam, with the non-reactive phosphorous compound and expandable graphite also being present but non-reactive and thus remaining in the formed polyurethane foam.

As is known in the art, during the polyurethane foaming reaction between the isocyanate component and the isocyanate-reactive component, the blowing agent promotes the release of a blowing gas which forms cell voids in the polyurethane foam. The blowing agent may be a physical blowing agent, a chemical blowing agent, or a combination of a physical blowing agent and chemical blowing agent.

The terminology "physical blowing agent" refers to blowing agents that do not chemically react with the isocyanate component and/or the isocyanate-reactive component to provide the blowing gas. The physical blowing agent can be a gas or liquid. The liquid physical blowing agent typically evaporates into a gas when heated, and typically returns to a liquid when cooled. The physical blowing agent typically reduces the thermal conductivity of the polyurethane foam.

Suitable physical blowing agents for the purposes of the subject invention may include liquid $CO_2$, acetone, methyl formate, and combinations thereof. The most typical physical blowing agents typically have a zero ozone depletion potential.

The terminology "chemical blowing agent" refers to blowing agents which chemically react with the isocyanate component or with other components to release a gas for foaming. Examples of chemical blowing agents that are suitable for the purposes of the subject invention include formic acid, water, and combinations thereof.

The blowing agent is typically present in the isocyanate-reactive component in an amount of from about 0.5 to about 20 parts by weight based on 100 parts by weight of total polyol present in the isocyanate-reactive component. In certain embodiments, a combination of chemical and physical blowing agents is utilized, such as water and liquid $CO_2$.

As set forth above, the present invention also provides methods of producing the polyurethane foam.

One exemplary method of producing the polyurethane foam comprises the steps of providing the isocyanate component, providing the isocyanate-reactive component, and reacting the isocyanate component with the isocyanate-reactive component to produce the polyurethane foam. The method may further comprise the steps of providing the catalyst component and reacting the isocyanate component with the isocyanate-reactive component in the presence of the catalyst component to produce the polyurethane foam. In certain embodiments, the non-reactive phosphorous compound is premixed with the isocyanate-containing compound prior to reacting the isocyanate-containing compound with the isocyanate-reactive component. In certain other embodiments, the expandable graphite is premixed with the polyether polyol prior to reacting the isocyanate-containing compound with the isocyanate-reactive component. In still other embodiments, the non-reactive phosphorous compound is premixed with the isocyanate-containing compound and the expandable graphite is premixed with the polyether polyol prior to reacting the isocyanate-containing compound with the isocyanate-reactive component.

Another exemplary method for producing the polyurethane foam comprises the steps of first mixing the expandable graphite present in an amount ranging from 3 to 30 weight percent based on the total weight of the polyurethane foam with a first isocyanate-reactive component.

Next, the isocyanate component comprising the isocyanate-containing compound and the non-reactive phosphorous compound present in an amount ranging from 1 to 20 weight percent based on the total weight of the polyurethane foam is provided or otherwise formed.

Next, the isocyanate component and a second isocyanate-reactive component are introduced into a chamber (i.e., a mixing vessel commonly used in the foam industry) under high pressure in the presence of the blowing agent, preferably through a pair of high pressure mixing nozzles (i.e., nozzle heads) commonly used in the formation of polyurethane foams. The term "high pressure", as defined herein, refers to a pressure sufficiently high to ensure the complete mixing of the second isocyanate-reactive component and the isocyanate component. Preferably, the term "high pressure" refers to a pressure from about 1800 to 2200 pounds per square inch ("psi")(124.1 bars to 151.7 bars), such as about 2000 psi (137.9 bars).

The first and second isocyanate-reactive component used in this method may be the same or different and may comprise any of the isocyanate-reactive components, including the polyether polyols of paragraph [0026], as described above. Similarly, the isocyanate-containing compound and the non-reactive phosphorous compound utilized in this method may utilize any of the isocyanate-containing compounds and non-reactive phosphorous compounds, respectively, described above.

In addition, the mixture including the first isocyanate-reactive component and expandable graphite is introduced to the chamber at a lower pressure, preferably through a third mixing nozzle. As defined herein, the term "lower pressure" refers to a pressure that is lower than "high pressure" but is sufficiently high to promote the complete mixing of the first isocyanate-reactive component and expandable graphite with the second isocyanate-reactive component and the isocyanate component. Preferably, the term "lower pressure" is a pressure from about 500 to 700 pounds psi (34.47 to 48.26 bars), such as about 600 psi (41.37 bars). Upon introduction to the chamber, the first and second isocyanate-reactive components react with the isocyanate-containing compound of the isocyanate component within the chamber to form the polyurethane foam.

Without intending to be limited by theory, it is believed that the introduction to the chamber of the mixture including the expandable graphite at a lower pressure may decrease the potential shear of the expandable graphite during formation of the polyurethane foam, and such a decrease may improve the flame retardancy of the subsequently formed polyurethane foam, although either method described above forms polyurethane foams that exhibit a UL 94 vertical flame classification of V-0. That is, the polyurethane foam of the present invention formed by either method above exhibits excellent flame retardancy and satisfies requirements for a classification of V-0 in accordance with the Tests for the Flammability of Plastic Materials—UL 94, and maintains the UL 94 vertical flame classification of V-0 after one week of heat aging at 150° C.

In either method, the isocyanate component and the isocyanate-reactive component (or the first and second isocyanate-reactive components) are reacted at an isocyanate index of greater than or equal to about 90, more preferably greater than or equal to about 100, even more preferably at about 110. The term "isocyanate index" is defined as the ratio of NCO groups in the isocyanate component to hydroxyl groups in the isocyanate-reactive component multiplied by 100. The polyurethane foam of the present invention may be produced by mixing the isocyanate component and the isocyanate-reactive component to form a mixture at room temperature or at slightly elevated temperatures, e.g., 15 to 30° C. It certain embodiments in which the polyurethane foam is produced in a mold, it is to be appreciated that the isocyanate component and the isocyanate-reactive component may be mixed to form the mixture prior to disposing the mixture in the mold. For example, the mixture may be poured into an open mold or the mixture may be injected into a closed mold. Alternatively, the isocyanate component and the isocyanate-reactive component may be mixed to form the mixture within the mold. In these embodiments, upon completion of the polyurethane foaming reaction, the polyurethane foam takes the shape of the mold. The polyurethane foam may be produced in, for example, low pressure molding machines, low pressure slabstock conveyor systems, high pressure molding machines, including multi-component machines, high pressure slabstock conveyor systems, and/or by hand mixing. Thus, the methods of the present invention may be utilized to form a polyurethane foam for use in the engine compartment of a vehicle that achieves the requisite UL-94 flammability standard as described above and exhibits excellent noise, vibration and harshness (NVH) properties and other support properties, e.g., flexibility and stability, even after heat aging for one week at 150° C.

In certain embodiments, the polyurethane foam is produced or disposed in a slabstock conveyor system, which typically forms polyurethane foam having an elongated rectangular or circular shape. It is particularly advantageous to produce the polyurethane foam in slabstock conveyor systems due to the excellent processability of the polyurethane foam. As known in the art, slabstock conveyor systems typically include mechanical mixing head for mixing individual components, e.g., the isocyanate component and the isocyanate-reactive component, a trough for containing a polyurethane foaming reaction, a moving conveyor for polyurethane foam rise and cure, and a fall plate unit for leading expanding polyurethane foam onto the moving conveyor.

As set forth above, the polyurethane foam of the present invention has a density of from about 2.0 to about 15.0 pounds per cubic foot (32 to 240 kg/m$^3$), more typically from about 3 to about 12 pounds per cubic foot (48 to 180 kg/m$^3$), and most typically from about 4 to about 10 pounds per cubic foot (64 to 160 kg/m$^3$). Unexpectedly, despite having such a density, the polyurethane foam exhibits a UL 94 vertical flame classification of V-0 and maintains the UL 94 vertical flame classification of V-0 after one week of heat aging at 150° C. It is believed that the synergistic effect of the addition of suitable amounts of the non-reactive phosphorous compound and the expandable graphite to the polyurethane foam contributes to its improved flammability resistance.

Moreover, the polyurethane foam of the present invention not only exhibits flame retardancy, but also exhibits excellent noise, vibration and harshness (NVH) properties and other support properties, e.g., flexibility and stability, and maintains such characteristics even under severe heat aging, such as after one week of heat aging at 150° C. The polyurethane foam in accordance with the present invention is particularly suitable for use as foam reinforcement for engine compartment articles for vehicles, but may find application in other applications beyond engine compartments where polyurethane foams may be utilized and in particular wherein NVH reduction and flame retardancy is desirable.

The following examples are intended to illustrate the invention and are not to be viewed in any way as limiting to the scope of the invention.

EXAMPLES

Polyurethane foam samples in accordance with the present invention were prepared as described below and evaluated for flammability using the UL-94 Vertical Flammability Test.

UL-94 Vertical Flammability Test

The UL 94 Vertical (UL 94V) Flammability Test was developed by Underwriters Laboratories to evaluate the physical characteristics and safety of different plastics when they're exposed to flame. During the course of a UL 94V test, the material under evaluation is tested in two different states: first, in its unaltered "as manufactured" state, and then in its "aged" state, a condition that is achieved by exposing the plastic sample to a temperature of 150° C. for a full 7 days (168 hours). In certain embodiments below, additional aged exposure of 600 and 3000 hours, respectively, was reported.

Before the test begins, plastic samples are placed vertically in the burn chamber. Each sample is 127 mm long× 12.7 mm wide in dimension (approximately ½ inch thick), with the same thickness as the final product that will be formed from the plastic. In certain embodiments below, samples of approximately ¼ inch were also evaluated. Once the sample has been mounted, a carefully controlled flame is placed under the specimen for 10 seconds and then removed. When the flame is no longer in contact with the specimen, any residual flaming combustion of the plastic sample is observed and recorded. When the plastic sample finally self-extinguishes, the controlled flame is immediately reapplied for another 10 seconds, and then removed. Again, the specimen's flaming combustion (in the absence of flame exposure) is recorded. Lastly, a piece of dry surgical cotton is placed 12 inches below the combusting sample. If any drips fall onto the cotton and cause it to ignite, this detail is also recorded. When all of the flame test data has been gathered, it's used to group the tested material into one of three specific material classes: 94 V-0, 94 V-1, or 94 V-2 (i.e., V-0, V-1, or V-2).

94 V-0
Following either or both of the controlled flame applications, samples may not sustain burning combustion for longer than 10 seconds.
Total flaming combustion time for 5 samples (counting both controlled-flame applications) may not exceed 50 seconds.
None of the samples may be burned up to the mounting clamp by either flaming or glowing combustion.
None of the samples may drip flaming particles that result in the ignition of the surgical cotton below them.
Following the removal of the second controlled flame, samples may not exhibit glowing combustion for more than 30 seconds.

94 V-1
Following either controlled flame application, none of the samples may sustain flaming combustion for longer than 30 seconds.
The total flaming combustion time for 5 samples (each exposed twice to a controlled flame) may not exceed 250 seconds.
Flaming or glowing combustion may not result in any of the samples being burned up to their holding clamps.
While samples may drip flaming particles that burn briefly, these particles may not cause the actual ignition of the underlying dry surgical cotton.
Samples may not exhibit glowing combustion for more than 60 seconds after the removal of the second controlled flame.

94 V-2
Following either the first or second controlled-flame application, none of the samples may support flaming combustion for longer than 30 seconds.
The total flaming combustion time for 5 samples (each being twice-exposed to a controlled flame) may not exceed 250 seconds.
Flaming or glowing combustion may not cause any of the samples to burn up to their holding clamps.
Samples are allowed to drip briefly-burning flaming particles, which may cause the dry surgical cotton they land on to ignite.
Upon the removal of the second controlled flame, none of the samples may exhibit glowing combustion for a period of time greater than 60 seconds.

Sample Evaluation Procedure

Hand-mix foams were prepared using standard techniques. A water-jacketed 12×12×0.5 inch rectangular block mold, maintained at 120° F., was treated with a release agent (ChemTrend RCT1200B) applied with a paintbrush. All components except the isocyanate were pre-blended using a 3-inch diameter German mixblade for 45 seconds at 2500 rpm. The isocyanate was then added to the resin blend, which was then mixed for an additional 5 seconds. The foam mixture was then poured into a mold, and the resulting foam block was de-molded in 3 minutes.

The resultant polyurethane foam samples were then tested for mold density and UL-94 flame retardancy. Each ingredient provided below was measured as a weight percent based on the total weight of the composition of the ingredients forming the polyurethane foam samples.

Comparative Example 1 illustrates a foam sample that includes about 15 weight percent expandable graphite and no phosphorous compound. Comparative Example 2 illustrates a foam sample that includes no expandable graphite but includes a non-reactive phosphorous compound at about 17% by weight which has a cumulative weight loss of less than 2% at 200° C. as measured by thermogravimetric analysis. Comparative Example 3 illustrates a foam sample having about 10% by weight expandable graphite and about 7% by weight of a non-reactive phosphorous compound (TEP—triethyl phosphate) which has a cumulative weight loss of greater than 2% at 200° C. as measured by thermogravimetric analysis.

Examples 4-15 further illustrate the combination of thermally stable non-reactive phosphate and expandable graphite having variable levels of the amount of phosphate and graphite. Examples 16-18 illustrate further combination of thermally stable non-reactive phosphate and expandable graphite in which the isocyanate index is reduced. Examples 19 and 20 illustrate further combination of thermally stable phosphate and expandable graphite which utilizes a simple MDI blend. The results are summarized in Tables 1-5 below, with (Each ingredient listed in Tables 1-5 is provided in weight (i.e., grams)):

TABLE 1

|  | Comparative Example 1 | Comparative Example 2 | Comparative Example 3 |
|---|---|---|---|
| Ingredient |  |  |  |
| 36100450-2-4 Resin[1] | 50.08 | 48.86 | 48.86 |
| Fyrolflex RDP[2] |  | 16.89 |  |
| TEP[3] |  |  | 7.24 |
| Nyagraph 251[4] | 14.87 |  | 9.65 |
| 36100450-2-4 Isocyanate[5] | 35.09 | 34.25 | 34.25 |
| Index | 100 | 100 | 100 |
| Tests |  |  |  |
| Molded Density (pcf) (12 × 12 × 0.5-Inch) | 7.2 | 7.4 | 7.2 |
| UL-94 Vertical Flammability Test (Original) | Fail | Fail | V-0 |
| UL-94 Vertical Flammability Test (Heat Aged 7 days 150° C.) | Fail | Fail | Fail |

[1] A resin blend (polyols, catalysts, surfactants, water, and pigment) available from BASF.
[2] Resorcinol bis (diphenyl phosphate) available from ICL Industrial Products.
[3] Triethylphosphate.
[4] Expandable Graphite commercially available from Nyacol Nano Technologies.
[5] Uretonimine-modified 4,4'-MDI available from BASF

TABLE 2

|  | Example 4 | Example 5 | Example 6 | Example 7 | Example 8 | Example 9 |
|---|---|---|---|---|---|---|
| Ingredient |  |  |  |  |  |  |
| 36100450-2-4 Resin[1] | 48.86 | 47.71 | 48.86 | 47.71 | 46.62 | 48.86 |
| Fyrolflex RDP[2] | 7.24 | 7.07 | 9.65 | 9.42 | 9.21 | 12.06 |
| Nyagraph 251[4] | 9.65 | 11.78 | 7.24 | 9.42 | 11.51 | 4.82 |
| 36100450-2-4 Isocyanate[5] | 34.25 | 33.44 | 34.25 | 33.44 | 32.67 | 34.25 |
| Index | 100 | 100 | 100 | 100 | 100 | 100 |
| Tests |  |  |  |  |  |  |
| Molded Density (pcf) (12 × 12 × 0.5-Inch) | 7 | 7 | 7 | 7 | 7 | 7 |
| UL-94 Vertical Flammability Test (Original) | V-0 | V-0 | V-0 | V-0 | V-0 | V-0 |
| UL-94 Vertical Flammability Test (Heat Aged 7 days 150° C.) | V-0 | V-0 | V-0 | V-0 | V-0 | V-0 |

TABLE 3

|  | Example 10 | Example 11 | Example 12 | Example 13 | Example 14 | Example 15 |
|---|---|---|---|---|---|---|
| Ingredient |  |  |  |  |  |  |
| 36100450-2-4 Resin[1] | 47.71 | 46.62 | 45.56 | 47.71 | 46.62 | 45.56 |
| Fyrolflex RDP[2] | 11.78 | 11.51 | 11.25 | 14.13 | 13.81 | 13.50 |
| Nyagraph 251[4] | 7.07 | 9.21 | 11.25 | 4.71 | 6.90 | 9.00 |
| 36100450-2-4 Isocyanate[5] | 33.44 | 32.67 | 31.93 | 33.44 | 32.67 | 31.93 |
| Index | 100 | 100 | 100 | 100 | 100 | 100 |

TABLE 3-continued

| | Example 10 | Example 11 | Example 12 | Example 13 | Example 14 | Example 15 |
|---|---|---|---|---|---|---|
| Tests | | | | | | |
| Molded Density (pcf) (12 × 12 × 0.5-Inch) | 7 | 7 | 7 | 7 | 7 | 7 |
| UL-94 Vertical Flammability Test (Original) | V-0 | V-0 | V-0 | V-0 | V-0 | V-0 |
| UL-94 Vertical Flammability Test (Heat Aged 7 days 150° C.) | V-0 | V-0 | V-0 | V-0 | V-0 | V-0 |

TABLE 4

| | Example 16 | Example 17 | Example 18 |
|---|---|---|---|
| Ingredient | | | |
| 36100450-2-4 Resin[1] | 51.51 | 53.44 | 56.62 |
| Fyrolflex RDP[2] | 7.63 | 7.91 | 8.39 |
| Nyagraph 251[4] | 10.17 | 10.55 | 11.18 |
| 36100450-2-4 Isocyanate[5] | 30.69 | 28.09 | 23.81 |
| Index | 85 | 75 | 60 |
| Tests | | | |
| Molded Density (pcf) (12 × 12 × 0.5-Inch) | 7 | 7 | 7 |
| UL-94 Vertical Flammability Test (Original) | V-0 | V-0 | V-0 |
| UL-94 Vertical Flammability Test (Heat Aged 7 days 150° C.) | V-0 | V-0 | V-0 |

TABLE 5

| | Example 19 | Example 20 |
|---|---|---|
| Ingredient | | |
| 36100450-2-24 Resin[6] | 52.85 | 51.49 |
| Fyrolflex RDP[2] | 7.93 | 7.73 |
| Nyagraph 251[4] | 10.57 | 12.87 |
| 36100450-2-24 Isocyanate[7] | 28.66 | 27.92 |
| Index | 100 | 100 |
| Tests | | |
| Molded Density (pcf) (12 × 12 × 0.5-Inch) | 7.2 | 7.3 |
| UL-94 Vertical Flammability Test (Original) | V-0 | V-0 |
| UL-94 Vertical Flammability Test (Heat Aged 7 days 150° C.) | V-0 | V-0 |

[6]A resin blend (polyols, catalysts, surfactants, water, and pigment) available from BASF.
[7]MDI blend of 2,4'-MDI; 4,4'-MDI; and polymeric MDI) available from BASF.

Comparative Example 1 generally illustrates that the use of expandable graphite in a formulation including a uretonimine-modified MDI does not meet UV-94 Class V-0 both before and after heat aging. In addition, Comparative Example 2 generally illustrates that the use of thermally stable non-reactive phosphate (i.e., phosphorous compounds having a cumulative weight loss of less than 2% at 200° C. as measured by thermogravimetric analysis) in a formulation including a uretonimine-modified MDI also does not meet UV-94 Class V-0 both before and after heat aging. Further, Comparative Example 3 generally illustrates that the use of expandable graphite and non-reactive phosphorous compounds (which does not have a cumulative weight loss of less than 2% at 200° C. as measured by thermogravimetric analysis) in a formulation including a uretonimine-modified MDI also does not meet UV-94 Class V-0 both before and after heat aging.

By contrast, Examples 4-15 illustrate generally that the combination of a thermally stable non-reactive phosphate and expandable graphite in a formulation of a polyurethane foam including uretonimine-modified MDI meet UV-94 Class V-0 both before and after heat aging. Further, the polyurethane foam still meets UV-94 Class V-0 even with a reduction of the isocyanate index as in Examples 16-18. In another polyurethane foam formulation using a simple MDI blend and a combination of a thermally stable non-reactive phosphate and expandable graphite, UL-94 Class V-0 was also achieved (Examples 19-20).

Comparison Study—Stability and Foam Formation Evaluation

Next, a comparative study was performed regarding the stability and foam formation evaluation for samples in which Fyrolflex RDP (a non-reactive phosphorous composition) was either premixed with the resin package of Examples 4-18 (Premixed Sample 1) or premixed with the isocyanate (Premixed Sample 2) and stored for a period of time prior to application (as shown in Table 6, for 24 hours). The formulation of Premixed Samples 1 and 2, respectively, were thus equivalent chemically to the formulation for Example 4 provided above.

Samples were evaluated for foam formation properties after 24 hours of aging, with the results summarized in Table 6 below:

TABLE 6

| | Premixed Sample 1 | Premixed Sample 2 |
|---|---|---|
| Ingredient | | |
| 36100450-2-4 Resin[1] | | 48.86 |
| Nyagraph 251[4] | 9.65 | 9.65 |
| 36100450-2-4 Resin[1]/FyrolflexRDP (Aged 24 hours before application) | 56.11 | |
| 36100450-2-4 Isocyanate[5] | 34.25 | |
| 36100450-2-4 Isocyanate[5]/FyrolflexRDP (Aged 24 hours before application) | | 41.50 |
| Index | 100 | 100 |
| Tests | | |
| Foam Quality | Poor Foam | Good Foam |
| Molded Density (pcf) (12 × 12 × 0.5-Inch) | 7 | 7 |

TABLE 6-continued

| | Premixed Sample 1 | Premixed Sample 2 |
|---|---|---|
| UL-94 Vertical Flammability Test (Original) | No Test | V-0 |
| UL-94 Vertical Flammability Test (Heat Aged 7 days 150° C.) | No Test | V-0 |

The Examples confirm that the premixing of the non-reactive phosphorous composition with the resin package, followed by 24 hours of aging (Premixed Sample 1), did not produce a good foam and hence was not testable for flammability resistance, while the corresponding sample in which the non-reactive phosphorous composition was premixed with the isocyanate-containing compound and aged for 24 hours (Premixed Sample 2) did not reduce the reactivity of the ingredients and resulted in similar polyurethane foams having similar flammability resistance to those provided in Example 4 above. Without intending to be bound by any theory, it is believed that water present in the resin reacted with organic phosphates from the non-reactive phosphorous composition to form phosphoric acid and alcohol within 24 hours of aging. The phosphoric acid in turn blocks the tertiary amine catalysts) in the foam formulation, which slows the blowing and gelling reactions necessary to produce polyurethane foam and resulted in the poor quality foam of Premixed Sample 1. While not illustrated in Table 6 above, additional examples according to premixed Sample 2 were aged for up to three months and still formed good foams that achieved similar mold density and flame retardancy to Premixed Sample 2 and Example 4 described above.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. A method for forming a polyurethane foam comprising the steps of:
   providing an isocyanate component comprising:
      an isocyanate-containing compound, and
      a non-halogenated, non-reactive phosphorous compound present in an amount ranging from 1 to 20 weight percent based on the total weight of the polyurethane foam and having a cumulative weight loss of 2% or less at 200° C. as measured by thermogravimetric analysis using a 10° C./min. heating rate in nitrogen to 200° C., wherein the non-halogenated, non-reactive phosphorous compound is liquid at 25° C. and is premixed with the isocyanate-containing compound prior to reacting the isocyanate component with the isocyanate-reactive component;
   providing an isocyanate-reactive component comprising:
      expandable graphite present in an amount ranging from 3 to 30 weight percent based on the total weight of the polyurethane foam, and
      a polyether polyol having a weight-average molecular weight from 2,500 to 6,000 g/mol and a hydroxyl number from 25 to 60 KOH/g,
      wherein the non-halogenated, non-reactive phosphorous compound is not premixed in the provided isocyanate-reactive component; and
   reacting the isocyanate component with the isocyanate-reactive component in the presence of a blowing agent to form the polyurethane foam.

2. The method as set forth in claim 1, further comprising the step of premixing the expandable graphite with the polyether polyol prior to reacting the isocyanate component with the isocyanate-reactive component.

3. A method for forming a polyurethane foam comprising the steps of:
- (a) mixing expandable graphite present in an amount ranging from 3 to 30 weight percent based on the total weight of the polyurethane foam with a first isocyanate-reactive component;
- (b) providing an isocyanate component comprising:
  an isocyanate-containing compound, and
  a non-halogenated, non-reactive phosphorous compound premixed with the isocyanate-containing compound, the non-halogenated, non-reactive phosphorous compound present in an amount ranging from 1 to 20 weight percent based on the total weight of the polyurethane foam, the non-reactive phosphorous compound having a cumulative weight loss of 2% or less above 200° C. as measured by thermogravimetric analysis using a 10° C./min. heating rate in nitrogen to 200° C., wherein the non-halogenated, non-reactive phosphorous compound is liquid at 25° C.;
- (c) introducing the isocyanate component and a second isocyanate-reactive component to a chamber under high pressure in the presence of a blowing agent;
- (d) introducing the mixed expandable graphite and first isocyanate-reactive component to the chamber at a lower pressure; and
- (e) reacting the isocyanate component with the first isocyanate-reactive component and the second isocyanate-reactive component in the presence of the blowing agent to form the polyurethane foam;

wherein the first isocyanate-reactive component and the second isocyanate-component each comprise a polyether polyol having a weight-average molecular weight from 2,500 to 6,000 g/mol and a hydroxyl number from 25 to 60 KOH/g, and wherein the non-halogenated, non-reactive phosphorous compound is not premixed with the first isocyanate-reactive component and is not premixed with the second isocyanate component prior to reacting the isocyanate component with the first isocyanate-reactive component and the second isocyanate-reactive component.

4. The method of claim 3 wherein the first isocyanate-reactive component is the same composition as the second isocyanate-reactive component.

5. The method of claim 1, wherein the formed polyurethane foam has a UL 94 vertical flame classification of V-0.

6. The method of claim 5, wherein the formed polyurethane foam maintains a UL 94 vertical flame classification of V-0 after one week of heat aging at 150° C.

7. The method of claim 5, wherein the formed polyurethane foam has a density of from 32 to 240 kg/m$^3$.

8. The method of claim 3, wherein the non-halogenated, non-reactive phosphorous compound is premixed with the isocyanate-containing compound prior to steps (c), (d) and (e).

9. The method of claim 3, wherein the formed polyurethane foam has a UL 94 vertical flame classification of V-0.

10. The method of claim 3, wherein the formed polyurethane foam maintains a UL 94 vertical flame classification of V-0 after one week of heat aging at 150° C.

11. The method of claim 3, wherein the formed polyurethane foam has a density of from 32 to 240 kg/m$^3$.

* * * * *